(12) United States Patent
Neef et al.

(10) Patent No.: US 10,851,811 B2
(45) Date of Patent: Dec. 1, 2020

(54) FLUID SYSTEM AND PROCESS VALVE

(71) Applicant: Festo SE & Co. KG, Esslingen (DE)

(72) Inventors: Bodo Neef, Neuhausen (DE); Christoph Maile, Hochdorf (DE)

(73) Assignee: FESTO SE & CO. KG, Esslingen (DE)

(*) Notice: Subject to any disclaimer, the term of this patent is extended or adjusted under 35 U.S.C. 154(b) by 101 days.

(21) Appl. No.: 15/757,817

(22) PCT Filed: Sep. 10, 2015

(86) PCT No.: PCT/EP2015/070766
§ 371 (c)(1),
(2) Date: Mar. 6, 2018

(87) PCT Pub. No.: WO2017/041848
PCT Pub. Date: Mar. 16, 2017

(65) Prior Publication Data
US 2018/0355893 A1    Dec. 13, 2018

(51) Int. Cl.
*F15B 13/16* (2006.01)
*F16K 37/00* (2006.01)
*F15B 9/09* (2006.01)

(52) U.S. Cl.
CPC ............... *F15B 13/16* (2013.01); *F15B 9/09* (2013.01); *F16K 37/005* (2013.01);
(Continued)

(58) Field of Classification Search
CPC .. F15B 9/09; F15B 13/16; F15B 2211/50563; F15B 2211/6656; F16K 37/005; F16K 37/0091; Y10T 137/2693
(Continued)

(56) References Cited

U.S. PATENT DOCUMENTS 3,722,525 A * 3/1973 Epple .................. F15C 3/04
137/106
4,216,702 A * 8/1980 Brundidge ............ F15B 11/024
137/119.08
(Continued)

FOREIGN PATENT DOCUMENTS

DE        19543876      5/1997
DE      102012003231    3/2013
(Continued)

*Primary Examiner* — William M McCalister
(74) *Attorney, Agent, or Firm* — Hoffmann & Baron, LLP

(57) ABSTRACT

A fluid system with a safety-oriented valve assembly including a first fluid connection for a fluidic connection with a fluid connection of a fluid source or a control valve and a second fluid connection for coupling a fluid load as well as a fluid channel between the fluid connections, wherein a first valve can be actuated between a fluid supply position, or open position, and a fluid discharge position, or closed position, is arranged in the fluid channel, wherein a second valve which can be adjusted between an open position for the fluid channel and a throttle position for the fluid channel is arranged in the fluid channel and wherein a sensor for detecting a fluid pressure and for outputting a fluid pressure-dependent sensor signal is arranged in a section of the fluid channel between the first valve and the second valve and including a controller which is designed to process the sensor signal and to process control signals for the valve.

11 Claims, 3 Drawing Sheets

(52) U.S. Cl.
CPC . *F16K 37/0091* (2013.01); *F15B 2211/50563* (2013.01); *F15B 2211/6656* (2013.01); *Y10T 137/2693* (2015.04)

(58) Field of Classification Search
USPC .................................................. 137/119.08
See application file for complete search history.

(56) References Cited

U.S. PATENT DOCUMENTS

| | | | | |
|---|---|---|---|---|
| 5,419,129 | A * | 5/1995 | Becker | E02F 9/2225 60/452 |
| 6,694,803 | B2 * | 2/2004 | Klik | F15B 11/028 73/1.71 |
| 8,240,444 | B2 * | 8/2012 | Ulbricht | F16H 61/0021 192/221 |
| 8,820,345 | B2 * | 9/2014 | Gergaud | E02F 9/123 137/118.06 |
| 9,044,913 | B2 * | 6/2015 | Kurz | B30B 15/163 |
| 2003/0147757 | A1 * | 8/2003 | Kanno | B21D 5/02 417/269 |
| 2003/0182938 | A1 * | 10/2003 | Smith | F01P 7/044 60/422 |
| 2004/0177749 | A1 * | 9/2004 | Joergensen | A01B 63/1013 91/445 |
| 2009/0007769 | A1 * | 1/2009 | Matsumoto | F15B 9/09 91/1 |
| 2009/0183548 | A1 * | 7/2009 | Monkowski | G01F 25/0053 73/1.35 |
| 2014/0076440 | A1 * | 3/2014 | Chaika | F15B 9/09 137/637 |
| 2014/0158469 | A1 * | 6/2014 | Bisig | F15B 11/167 60/393 |
| 2014/0250877 | A1 * | 9/2014 | Bissbort | F15B 11/167 60/393 |
| 2015/0059331 | A1 * | 3/2015 | Hashimoto | F15B 13/0402 60/464 |
| 2016/0001795 | A1 * | 1/2016 | Ogawa | B61F 5/24 188/313 |

FOREIGN PATENT DOCUMENTS

| | | |
|---|---|---|
| EP | 0648900 | 4/1995 |
| EP | 1067319 | 1/2001 |
| EP | 1270954 | 1/2003 |

* cited by examiner

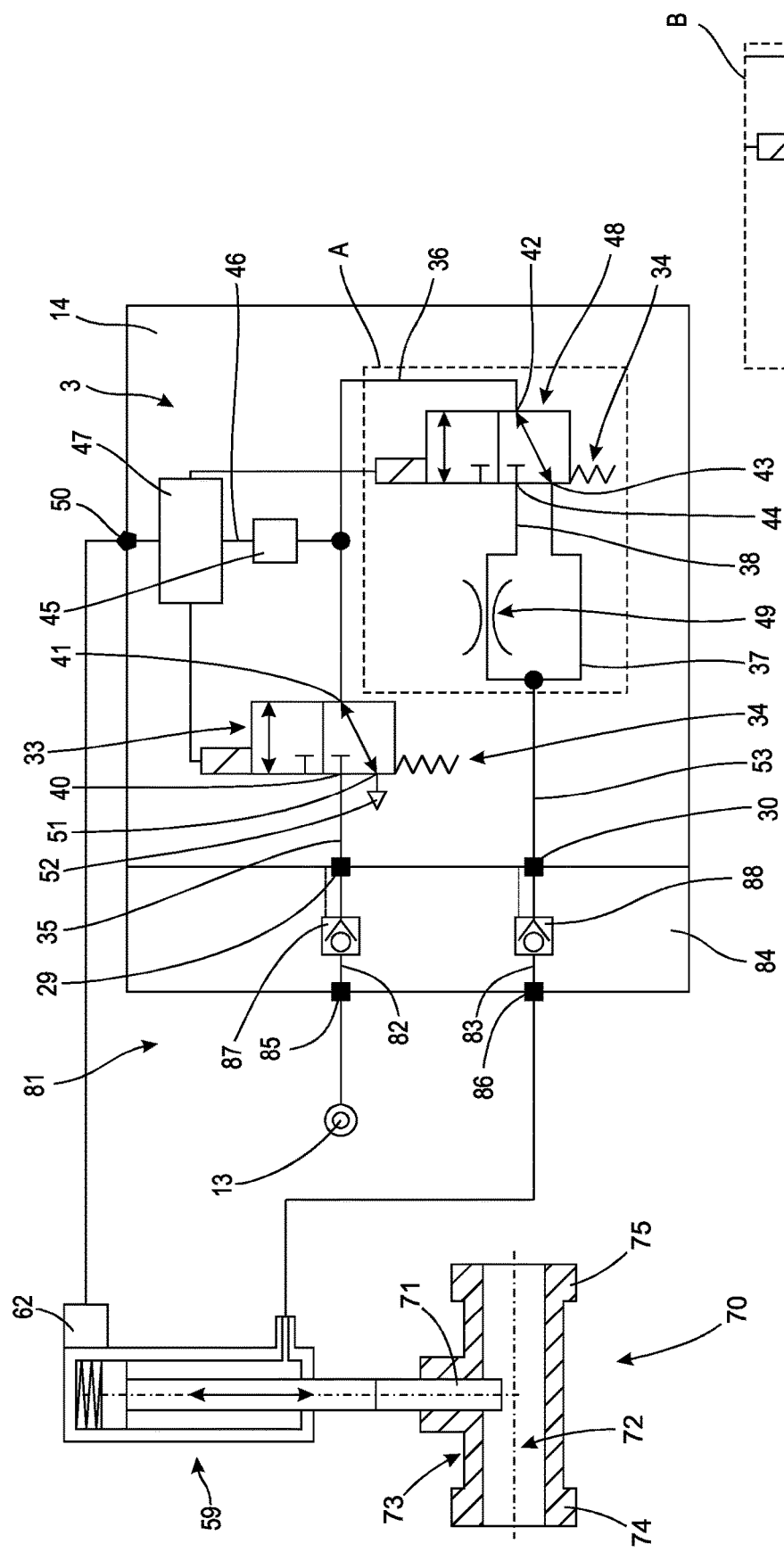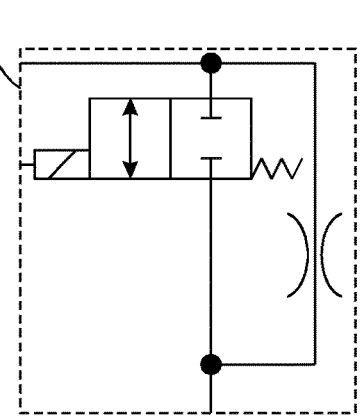
Fig. 1
Fig. 4

FLUID SYSTEM AND PROCESS VALVE

This application claims priority based on an International Application filed under the Patent Cooperation Treaty, PCT/EP2015/070766, filed Sep. 10, 2015.

BACKGROUND OF THE INVENTION

The invention relates to a fluid system with a safety-oriented valve assembly which is designed to influence a fluid flow between a fluid source or a control valve and a fluid load. The invention further relates to a process valve for influencing a cross-section of a fluid channel.

A generic process valve is known from DE 10 2012 003 231 B3. This process valve has a control head for a fluidically actuable valve having a base body which has a coupling device for fixing to the valve housing and a connection section for connecting at least one fluid conductor and is designed with a control valve device arranged on the base body which is designed to influence a control fluid flow, which can be provided at the connection section, in order to act on the valve body, as well as having a position measuring device assigned to the sensor tube which is designed to determine an axial position of the position detector.

SUMMARY OF THE INVENTION

The object of the invention is to provide a fluid system and a process valve with improved operational properties.

This object is achieved with a fluid system which has a safety-oriented valve assembly which is designed to influence a fluid flow between a fluid source or a control valve and a fluid load and which has a valve housing which has a first fluid connection for fluidically connecting to a fluid connection of a fluid source or a control valve and a second fluid connection for coupling a fluid load as well as a fluid channel between the fluid connections, a first valve which can be electrically or fluidically actuated between a fluid supply position, or open position, and a fluid discharge position, or closed position, being arranged in the fluid channel, an electrically or fluidically actuable second valve which can be adjusted between an open position for the fluid channel and a throttle position for the fluid channel being arranged in the fluid channel and a sensor for detecting a fluid pressure and for outputting a fluid pressure-dependent sensor signal being arranged in a section of the fluid channel between the first valve and the second valve, as well as having a controller which is designed to process the sensor signal and to process control signals for the valve.

With the aid of the safety-oriented valve assembly, it is possible to either directly or indirectly influence a fluid flow which should be provided by the fluid source or the control valve to the fluid load. In the case of a direct influence, the safety-oriented valve assembly acts directly on the fluid flow, which is provided by the fluid source or by the control valve. In the case of an indirect influence, the safety-oriented valve assembly acts on the control valve and thus influences the fluid flow from the control valve to the fluid load.

The first valve can, for example, be designed for optionally releasing or blocking the fluid channel. The first valve is designed for optionally switching between a fluid supply position, in which pressurised fluid is guided from a fluid source to the fluid load and a fluid discharge position, in which pressurised fluid is drained from the fluid load.

It is also possible with the aid of the safety-oriented valve assembly to check a function of the first valve of the safety-oriented valve assembly such that the second valve of the safety-oriented valve assembly for carrying out a test operation is set, in particular switched over from a first functional position, preferably the open position for the fluid channel into a second functional position, preferably the throttle position for the fluid channel. In this case, an unhindered flow of fluid is provided through the fluid channel in the first functional position of the second valve. In contrast, a throttle position is provided in the second functional position of the second valve, in which throttling of the fluid flow takes place. This throttling can, for example, be achieved by a throttle installed in the second valve or by a throttle in a partial branch of the fluid channel, the partial branch can be arranged upstream or downstream of the second valve. Two partial branches of the fluid channel are preferably guided in parallel between the second valve and the second fluid connection provided to connect the fluid load which can be brought into fluidically communicative connection with the fluid channel, which is arranged upstream of the second valve, depending on the switch position of the second valve. A throttle that can, in particular be set, is arranged in one of the two partial branches which causes the desired throttle effect for this partial branch.

To carry out the test operation, the first valve can be switched over, preferably repeatedly, between the fluid supply position or open position and fluid discharge position or closed position. Characteristic pressure ratios, which can be detected with the aid of the sensor and evaluated in the controller, result in the case of correct functioning of the first valve through the respective combination of the switch positions of the first valve and the second valve. The controller is also configured to at least detect, if required to also provide, control signals for the valve designed in particular as magnetic valves. It is thus possible to check in the controller, by linking the determined pressure valves of the sensor to the control signals, whether or not predefinable pressure valves are maintained in the different switch positions of the valve at least within an error interval that can also be predefined. Owing to the configuration of the second valve as a constantly open valve, which has a vent which is unthrottled in the first switch position and throttled in the second switch position and thus always allows a fluid flow irrespective of the switch position, it is ensured that failure of this second valve has no negative impact on the overall function of the safety-oriented valve assembly. Separate monitoring of the second valve is thus not required for safety-oriented considerations. The controller is preferably designed based on internally generated or externally provided control commands for actuating the two valve and to this end provides suitable electric control signals in the case of the configuration of the valve as magnetic valves.

Advantageous further developments of the invention are indicated in the dependent claims.

It is expedient for the controller to be arranged in the valve housing and to be designed for determining status information determined from the sensor signal and the control signals and has an interface for providing the status information. The controller can hereby be advantageously adjusted to the valve of the safety-oriented valve assembly. On the one hand, short electric and/or pneumatic connections between controller and the valve can be achieved by the common arrangement of the controller and the valve in the valve housing of the safety-oriented valve assembly. On the other hand, it is already specified with the construction of the fluid system, which valve are used for the safety-oriented valve assembly such that the controller can be advantageously adapted to these valve. The tasks of the controller include for example both the provision of control signals to the valve and the determination of status information which can for example be provided to a superordinate controller, in particular a memory-programmable controller (SPS). This status information characterises at least the functionality of the first valve, if required also the functionality of the second valve. The interface for providing the status information can optionally be designed as an electromechanical interface, in particular a plug or bushing or as a wireless interface, which allows a wireless transfer of the status information, in particular utilisation of electromagnetic waves.

The controller is preferably designed for unidirectional or bidirectional data communication with a superordinate control device according to the HART protocol. The HART protocol (highway addressable remote transducer) allows communication between the controller and a superordinate control device with high reliability and low technical complexity. The HART protocol here makes use of a current-assisted signal transfer that is in particular widely used in the process industry (4 mA to 20 mA), a frequency-modulated data signal being impressed on the control signal according to the HART protocol. Bidirectional data communication is preferably provided between the superordinate control device and the safety-oriented valve assembly, the superordinate control device providing an actuation signal, in particular as the current signal and the controller modulating the status signal to this actuation signal. The fluid system is particularly preferably configured to exclusively carry out its internal energy supply based on the provided current signal and to this end has corresponding switching devices.

In an advantageous further development of the invention, the controller is connected to the valve and the sensor via an electric line arrangement, in particular bus line or multipole. In this configuration of the fluid system, an arrangement of the control device, which is spatially distributed from the valve, is provided. This is in particular of interest when the safety-oriented valve assembly should be designed particularly compactly. Communication of the safety-oriented valve assembly with the controller is preferably provided via a bus system or direct wiring, which is also designated as multipole.

In a further configuration of the invention, the controller is designed for carrying out a test operation for the first valve which can be triggered by an internal and/or external signal, the test operation including at least one movement of the first valve between the open position and the closed position as well as the throttle position for the second valve and a comparison of the sensor signal with a predefinable threshold value. With the aid of this test operation, the functionality of the first valve can be tested at regular or irregular intervals. Testing at regular intervals can take place for example as a function of an internal signal of the controller which is provided for example by a program running in the controller. Additionally or alternatively, testing can take place at irregular intervals by providing an external signal which is provided for example by a superordinate control device for the case where maintenance of the system equipped with the fluid system is carried out in any case.

It is advantageous for a fluidically pilot-controlled control valve to be assigned to the safety-oriented valve assembly, the safety-oriented valve assembly being looped into a fluidic control line of the control valve and being designed to influence a position of a valve body of the control valve. The task of the fluidic control valve is to provide or switch off a fluid flow for a fluid load, a fluidic control or regulating signal being provided for the control valve, in particular by an upstream pilot valve which is, in turn, preferably designed as an electromechanical valve, in particular a magnetic valve. With the aid of the safety-oriented valve assembly, a fluid flow, which is supposed to be provided via the control line to the control valve, can thus be influenced directly by influencing the position of the fluidically pilot-controlled control valve. This allows the control valve belonging to a first safety category of a safety standard to form a secure fluid system owing to the effect of the assigned safety-oriented valve assembly belonging to a second safety category of the safety standard, said fluid system being designed according to the second safety category of the safety standard, the second safety category being established at a higher level than the first safety category within the safety standard. It is particularly advantageous here for the second safety category to be reached and maintained only by adding the safety-oriented valve assembly and no changes to the control valve being required to do so.

The control line of the control valve preferably has a control branch which is in fluidically communicative connection with a fluid connection of the control valve, a throttle device being arranged in the control branch. Feedback of a fluid pressure applied at the fluid connection on the control valve is constantly ensured by this connection of the control line to the fluid connection. The control valve is preferably pre-tensioned by suitable pretensioning means in a valve position in which no fluid flow takes place from the fluid source to the fluid load. When suitable fluid pressure is applied to the control line, the fluidically pilot-controlled control valve is moved into a valve position in which a fluid flow is enabled between fluid source and fluid load. The control valve is particularly preferably designed in a pressure-balanced manner such that the valve function of the control valve is independent of the fluid pressure level provided at the supply connection and available at the fluid connection.

It is expedient for the first fluid connection of the safety-oriented valve assembly to be connected to a fluid channel of a control valve and for the second fluid connection of the safety-oriented valve assembly to be designed as a fluid connection for the connection of the fluid load, the control valve and the safety-oriented valve assembly being designed a fluidic series connection for a redundant influence of a cross-section of the fluid channel. In this mode of operation, the safety-oriented valve assembly serves as an additional switch-off possibility for a fluid flow to be provided from the control valve to the fluid load such that in the case of possibly occurring failure of the control valve, by means of which it may be impossible to switch off the fluid flow with the aid of the control valve, the fluid flow can at least still be interrupted by the safety-oriented valve assembly. In the case of suitable design of the first valve of the safety-oriented valve assembly, permanent pressure application on the fluid load can be optionally maintained after the fluid flow between fluid source and fluid load has been successfully interrupted or venting of the fluid load can be carried out.

In the case of an advantageous further development of the invention, the first valve is arranged in a first valve module and the second valve is arranged in a second valve module and a stop valve is arranged in the fluid channel of the second valve module between the first valve and the second valve, the stop valve having a mechanical valve actuation which is designed for an interaction with the first valve module and is configured for a release position of the stop valve in the case of an available first valve module. An exchange of the first valve module during ongoing operation of the fluid system is enabled by this modular structure of the safety-oriented valve assembly since a mechanically actuated stop valve is actuated in the second valve module during expansion of the first valve module which is designed as a check valve and which prevents a fluid flowing through the fluid channel which is undesired at this time. As soon as the first valve module is in fluidically communicative coupling with the second valve module, the connected fluid load can be operated again in a regular manner. The fluid load is preferably a component which is seldom or possibly not active during normal operation and which is also designated as a low-demand component such that an exchange of the first valve module without relevant influence on the function of the fluid load is at least within a certain timeframe.

In a further configuration of the invention, a sensor is electrically connected to the controller and the controller is designed to provide control signals for the valve as a function of sensor signals of the sensor. Such a sensor can, for example, test a function of the fluid load, in order to, for example, be able to determine that the fluid load does not carry out a predefined movement. Alternatively, the sensor can also be designed to determine a physical variable, apart from the fluid system, for example a physical variable which occurs in a process system to which the fluid system is assigned. For example, the sensor determines a temperature or a pressure in a reactor vessel for which the fluid system is assigned to provide a fluid and a switch-off of the fluid supply must take place insofar as the determined physical variable is outside of a predefinable interval.

The object of the invention is also solved by a process valve which is designed for influencing a cross-section of a fluid channel and which has a valve housing which is passed by a fluid channel which opens into an input connection and into an output connection which are designed on the valve housing with a valve body movably received in the valve housing and designed to influence a cross-section of the fluid channel, with a fluid actuator, which is designed for a fluid-controlled introduction of movement to the valve body and with a fluid system according to the invention. Such a process valve serves to control a fluid flow of a process fluid, for example in the area of the chemicals industry or foodstuff industry and to this end has a valve housing in which a fluid channel is designed. A movable valve body is assigned to the fluid channel, which enables the cross-section of the fluid channel to be influenced and in particular to be brought into any positions between a closed position and an open position. To this end, a fluid actuator is assigned to the valve body, which may for example be a fluid cylinder or a fluidic swivel drive. Pressurised fluid is provided to the fluid actuator with the aid of the control valve which is connected to the fluid source and which can provide a fluid flow from the fluid source to a working connection. In order to enable functioning of the fluid actuator according to a predefinable safety category, which is higher within a given safety standard than the safety category of the control valve, without technical interference in said control valve, the safety-oriented valve assembly is assigned to the fluid connection of the control valve which enable blocking of the fluid flow to the fluid connection and which can preferably be actuated by a safety-oriented control device. By adding this safety-oriented valve assembly, which satisfies the requirements of a safety category within the given safety standard above the safety category for the control valve, the safety category can be increased for the process valve without all components of the process valve having to satisfy the requirements of the higher safety category for this purpose.

BRIEF DESCRIPTION OF THE DRAWINGS

Advantageous embodiments of the invention are represented in the drawing. It shows:

FIG. 1 a schematic block diagram representation of a first embodiment of a fluid system which has a safety-oriented valve assembly and a control valve, the safety-oriented valve assembly being designed for influencing a control fluid flow for the control valve, FIG. 2 a schematic block diagram representation of a second embodiment of a fluid system in which the safety-oriented valve assembly is designed for influencing a control fluid flow for the control valve, FIG. 3 schematic block diagram representation of a third embodiment of a fluid system which has a safety-oriented valve assembly and a control valve, the safety-oriented valve assembly being designed for influencing a working fluid flow which can be provided by the control valve, and FIG. 4 a variant for an assembly comprising a valve and a throttle for the safety-oriented valve assemblies of the first to third embodiment.

DETAILED DESCRIPTION OF THE PREFERRED EMBODIMENTS

Figure 2:
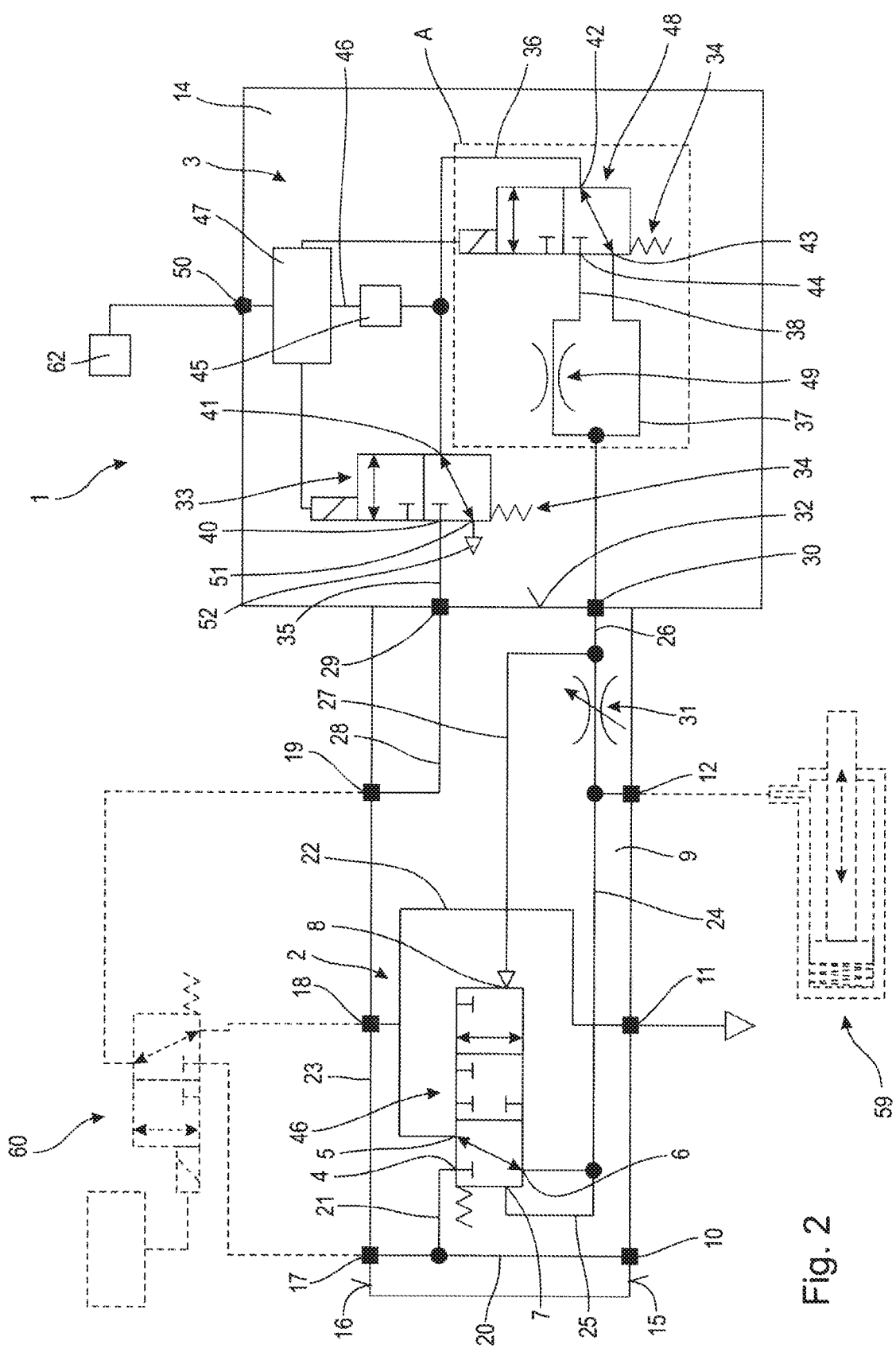

In the following description of the embodiments of a fluid system represented in FIGS. 1, 2 and 3, the same reference numerals are used for functionally-identical components. Firstly, there will be a description of the second embodiment represented in FIG. 2, followed by the descriptions of the first embodiment represented in FIG. 1 and the third embodiment represented in FIG. 3. In all embodiments, as they are represented in FIGS. 1 to 3, the assembly can be used according to FIG. 4 as an alternative to the second valve described in detail below and the assigned throttle.

Figure 3:
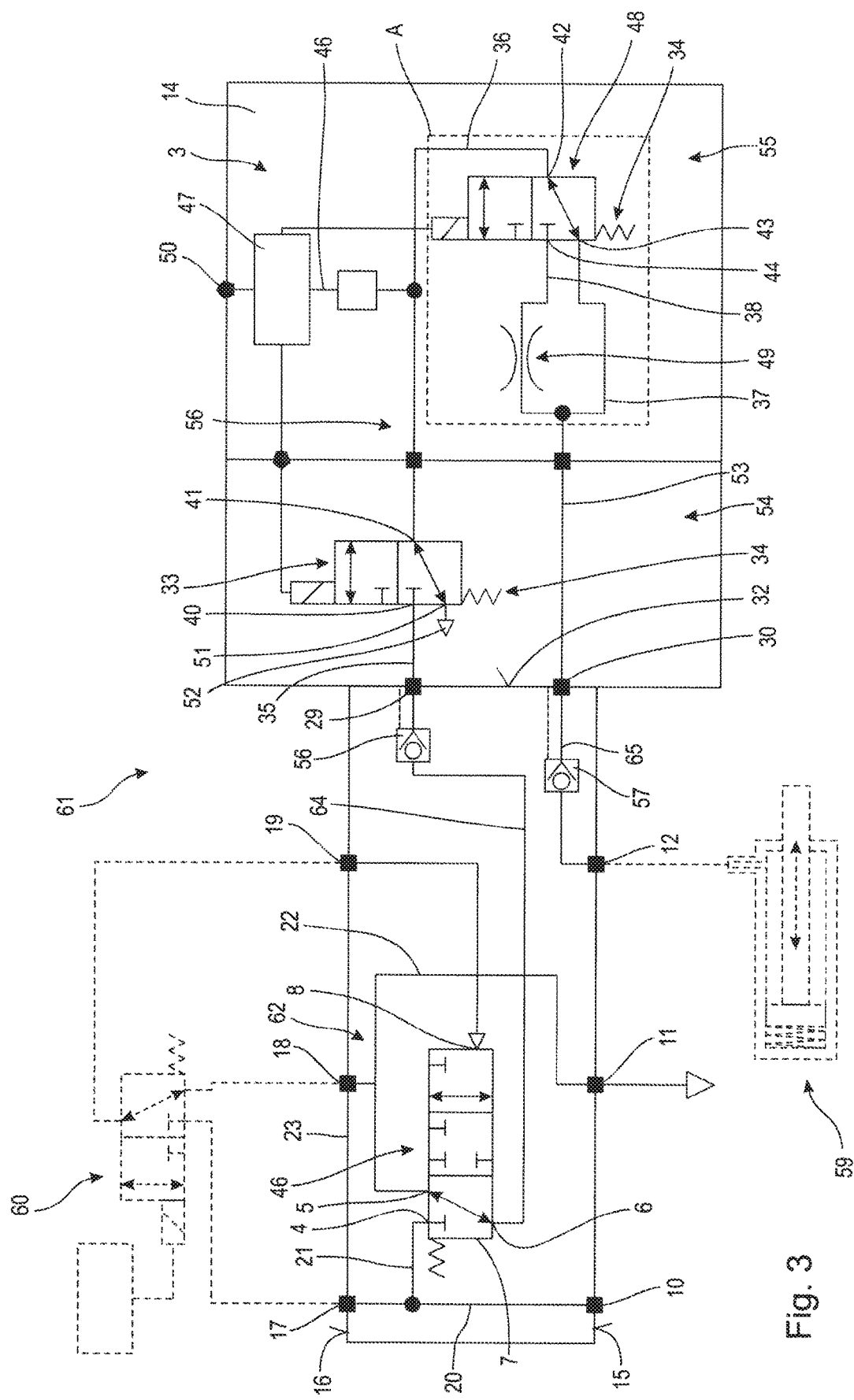

According to the representation of FIG. 2, a second embodiment of a fluid system 1 has a control valve 2 designed for example as a 3-3-way valve as well as a safety-oriented valve assembly 3.

For example, the control valve 2 is designed as a fluidically pilot-controlled, pressure-compensated valve, which, for example, has three internal fluid connections 4, 5, 6 as well as two internal control connections 7, 8. A supply connection 10, an exhaust air connection 11 provided for example with an exhaust air silencer as well as a working connection 12 are also designed on a connection surface 15 of a valve housing 9 of the control valve 2. The connection surface 15 serves, for example, as a customer-side coupling of a fluid source that is not represented, a sound absorber not represented and a fluid load 59, represented with a dashed line, to the control valve 2. A supply connection 17, an exhaust air connection 18 and a working connection 19 are designed on a coupling surface 16 of the valve housing 9. The coupling surface 16 serves, for example, to couple a pilot valve 60, represented with a dashed line, to the control valve 2.

A series of fluid channels 20 to 27 are designed in the valve housing 9 which connect the internal fluid connections 4, 5 and 6 and the internal control connections 7, 8 with the supply connections 10, 17, the exhaust air connections 11, 18 and the working connections 12, 19.

In the second embodiment of the control valve 2 represented in FIG. 2, the two supply connections 10, 17 are directly and uninterruptedly coupled to one another via the fluid channel 20. A fluid channel 21 branches off from the fluid channel 20 which is connected to the fluid connection 4. The exhaust air connections 11 and 18 are directly and uninterruptedly connected via the fluid channel 22, a fluid channel 23 connecting the fluid channel 22 to the fluid connection 5. The working connection 12 is connected to the fluid connection 6 via the fluid channel 24, a fluid channel 25 also extends from the fluid channel 24 to the control connection 7. The working connection 12 is also connected to a fluid channel 26, which, on the one hand, opens in a fluid connection, designated as a control input 29, of the safety-oriented valve assembly 3 designed as a separate assembly and, on the other hand, is connected via the fluid channel 27 to the control connection 8. In this case, a throttle 31, which can be set preferably electrically or manually, is arranged between the working connection 12 and the branch for the fluid channel 27, whose function for the fluidic interconnection in the control valve 2 is described in detail below. The working connection 19 is in fluidic communicative connection via a fluid channel 28 to a fluid connection of the safety-oriented valve assembly 3 designated as a control output 30. The control input 29 and the control output 30 of the safety-oriented valve assembly 3 are assigned to a connection surface 32 of the valve housing 9.

The safety-oriented valve assembly 3, for example, has a valve housing 14 in which a first valve 33 designed as an electrically-actuable 3-2-way valve is arranged, which is preferably designed as a magnetic valve and which is pre-tensioned into a preferred position owing to a pre-tensioned spring 34 without providing electric energy, as is represented in FIG. 2. When electric energy is provided to the valve 33, said valve can be brought into a switch position, not represented, from the preferred position represented in FIG. 2. While in the preferred position, a connection between the control input 29 and the control output 30 is interrupted by the valve 33, this connection is established in the switch position. Accordingly, fluid can be provided from the control input 29 via the fluid channel 35 to a fluid connection 40 of the valve 33 and be guided from there via the fluid connection 41 to the fluid channel 36. The fluid channel 36 is connected to a fluid connection 42 of the second valve 48 designed for example also as an electrically actuable 3-2-way valve and received in the valve housing 14, said valve is preferably designed as a magnetic valve pre-tensioned with a spring 34 into a preferred position. Since a fluid channel 37, 38 is respectively connected both to a fluid connection 43 and to a fluid connection 44 of the valve 48, which are in fluidically communicative connection via a common fluid channel 39 to the control output 30, there is always a fluidically communicative connection between the fluid connection 41 of the valve 33 and the control output 30 irrespective of a switch position of the valve 48. The fluid channel 38 is in this case provided with a throttle 49 such that an increased flow resistance for the fluid is present in the fluid channel 38 compared with the fluid channel 37.

A sensor 45 designed for example as a pressure sensor is assigned to the fluid channel 36 which is designed for pressure detection for the fluid flow in the fluid channel 36 and can provide an electric sensor signal via a signal line 46 to a processing device 47 as a function of the detected pressure. The processing device 47 is designed for example as a micro-processor and serves, in addition to processing the sensor signal of the sensor 45, also to electrically actuate the valve 33 and 48 and to this end is electrically connected to these valve 33, 48 via control lines which are not designated. The processing device 47 also has an interface 50 which is designed for bidirectional data communication with a superordinate control device, not represented, and, if required, with other components, for example additional sensors. The control signals are preferably provided from the superordinate control device to the processing device 47 according to the HART protocol. If required, sensor signals of an external sensor 62, which is connected to the interface 50, can be coupled into the processing device 47, where the sensor signals can be processed and can influence a processing result of the processing device 47. The sensor 62 is for example a cylinder switch assigned to the fluid load 59, a position sensor for determining a piston position of the fluid load 59 or another sensor, for example a process sensor for determining a value of a physical variable, which is connected to the fluid system 1.

For example, the processing device 47 is integrated in the safety-oriented valve assembly 3. In an alternative embodiment, not represented, the processing device is designed as a separate component and is arranged away from the valve device and is electrically connected to said valve device.

The mode of functioning of the fluid system 1 represented in FIG. 2 is described below with regard to the most important processes. In this case, it is assumed that the control valve 2 is connected with its supply connection 17, its exhaust air connection 18 and its working connection 19 to the pilot valve 60 represented with a dashed line, which can optionally establish a fluidically communicative connection between the supply connection 17 and the working connection 19 or the exhaust air connection 18 and the working connection 19 and which is not part of the fluid system 1.

It is also assumed that a fluid load 59 designed for example in the dashed representation as a single-acting, spring pre-tensioned pneumatic cylinder is connected to the working connection 12, said fluid load could alternatively be designed for example as a pneumatic swivel drive and which is not part of the fluid system 1. This fluid load 59 is for example provided as a valve drive or fluid actuator for a process valve 70 and movement-coupled to its valve body 71, the valve body 71 of the process valve 70 influencing a free cross-section of a fluid channel 72 extending through a valve housing 73 between an input connection 74 and an output connection 75 of the valve housing 73. A volume flow of a process fluid can thus be released or locked with the aid of the fluid load 59. Actuation of this process valve 70 is preferably provided seldom or practically never, nevertheless it must be ensured that the process valve 70 is always operationally ready such that a short-term movement of the valve body 71 of the process valve 70 is carried out for this purpose at regular or irregular intervals. In order to also enable checking of the functionality of the fluid system provided for providing pressurised fluid to the fluid load 59, this fluid system is configured in the manner described in detail below.

It is for example assumed that the working connection 12 should be permanently supplied with a fluid pressure made available at the supply connection 10 for actuating the process valve, not represented. Accordingly, the control valve 2 has to be switched over from the preferred position represented in FIG. 2 into a functional position, in which there is a fluidically communicative connection between the fluid channel 21 and the fluid channel 24. This is caused by a control pressure being provided at the working connection 19 with the aid of the pilot valve 60 only represented with a dashed line, which abuts on the control connection 8 of the control valve 2 after passing the safety-oriented valve assembly 3 via the fluid channels 26 and 27. In order to now determine whether the first valve 33 provided for increasing the safety level of the fluid system 1 functions properly, without the function of the control valve 2 being impaired by doing so, the second valve 48 is initially brought from preferred position, as is represented in FIG. 2, into a throttle position, not represented, in which a fluidically communicative connection is present between the fluid channel 36 and the control outlet 30 via the fluid channel 38. The first valve 33 is then repeatedly switched between the preferred position according to FIG. 2 and the switch position, not represented, and a pressure course is determined in the fluid channel 36 with the aid of the sensor 45. Since a fluid connection 51 of the first valve 33 is connected to an exhaust air connection 52, a pressure drop takes place in the fluid line 36 in the preferred position of the first valve 33. In the functional position of the first valve 33, not represented, a pressure build-up, in contrast, takes place in the fluid line 36 to a predefinable pressure level, insofar as the control valve 2 provide a corresponding fluid pressure at the control input 29. Owing to the throttle effect both of the throttle 49 and the throttle 31, a speed is limited for the pressure drop in the fluid line 36 such that no impairment for the control valve 2 actuated via the control output 30 occurs for short switch times for the first valve 33. If, however, in spite of a switchover of the valve 33 between the two switch positions, a pressure course that is not verifiable based on the sensor signal of the sensor 45 in the processing device 47 is set, which corresponds to a predefined pressure course, the processing device 47 can output an error signal to the interface 50. If, in contrast, an expected pressure course is set in the processing device 47, the output of a positive actuation signal or no signal to the interface 50 can be optionally provided. The valve 48 is then switched back into the preferred position, as is represented in FIG. 2, in order to complete the test operation.

In the first embodiment of a fluid system 81 represented in FIG. 1, the structure of the safety-oriented valve assembly 3 is identical to the second embodiment according to FIG. 2. Unlike this second embodiment of the fluid system 1, in the first embodiment of the fluid system 81 according to FIG. 1, a direct connection of a fluid source 13 is provided at the control input 29 and a direct connection of the fluid load 59 is provided at the control output 30. In this embodiment, the safety-oriented valve assembly 3 thus serves to directly supply the fluid load 59 with pressurised fluid from the fluid source 13 and a fluid discharge from the fluid load 59 in the case of a corresponding switch position of the first valve 33 designed for example as a 3-2-way valve. In the first embodiment of the fluid system 81, the checking of the switch function for the first valve 33 can take place in the same manner as the checking of the switch function for the second embodiment of the fluid system 1 described above. In order to improve the handling of this fluidic system 81, a channel plate 84 is provided, through which the fluid channels 35 and 53 are guided as fluid channels 82, 83 and open at fluid connections 85, 86 to which the fluid source 13 and the fluid load 59 are connected. In each of the fluid channels 82, 83, a mechanically actuated check valve 87, 88 is respectively arranged. These check valves 87, 88 enter a locking position, not represented, from the represented open position when the safety-oriented valve assembly is removed such that fluid flow cannot escape from the fluid load 59 via the fluid channel 83. Pressurised fluid from the fluid source 13 also cannot escape from the fluid channel 82 into the environment. In the case of new installation of the safety-oriented valve assembly 3 on the channel plate 84, the purely mechanically actuated check valves 87, 88 go back into the release position and thus enable a fluid flow from the fluid source 13 into the safety-oriented valve assembly 3 and from there to the fluid load 59 as a function of the switch position of the first valve 33.

In the third embodiment of a fluid system 61 represented in FIG. 3, a largely identical structure for the safety-oriented valve assembly 3 is provided as in the first and second embodiment, 81, 1. The previously described test of the functionality of the valve assembly 3 according to FIG. 2 must also be provided in the same manner for the embodiment of the valve assembly 3 according to FIG. 3.

Differing from the representation of FIG. 2 and corresponding to the representation of FIG. 1, direct influence of the safety-oriented valve assembly 3 on the fluid flow between the working connection 19 and the working connection 12 is provided in FIG. 3. Accordingly, a fluid channel 63 is guided to the control connection 8 of the control valve 62 from the working connection 19, which is in fluidically communicative connection with the electromechanical pilot valve 60 only represented with a dashed line such that there is no effect of the safety-oriented valve assembly 3 on the valve position of the control valve 2. In fact, a fluid channel 64 departing from the fluid connection 6 is guided to the control input 29 and is connected from there in a fluidically communicative connection to the fluid channel 35 in the safety-oriented valve assembly 3. Accordingly, the control output 30, which is connected in a fluidically communicative manner to the fluid channel 39 of the safety-oriented valve assembly, is connected in the control valve 62 via the fluid channel 65 with the working connection 12. As a result, a fluid flow provided at the fluid connection 6 by the control valve 62 proceeding from the supply connection 10 is initially guided via the safety-oriented valve assembly 3 before said fluid flow reaches the working connection 12. Accordingly, the fluid flow can be locked at the working connection 12 irrespective of the switch position of the control valve 62 with the aid of the safety-oriented valve assembly 3, for which purpose the first valve 33 is used. Since, in this case, the valve 33 adopts a central role for the safety level of the fluid system 61, said valve can be checked in the same manner as described above for the fluid system 1 according to FIG. 2, with the aid of the valve 48 without the function of the fluid load 59 connected to the working connection 12 being impaired by doing so.

For example, the safety-oriented valve assembly 3 is structured modularly, a first module 54 for example containing the first valve 33. A second module 55 contains for example the second valve 48 and the sensor 45 and the processing device 47. When determining a malfunction for the first valve 33, the first module 54 can be exchanged without the function of the downstream fluid load 59 being immediately impaired by doing so.

To this end, two controlled check valves 56 are respectively arranged in the fluid channels 64 and 65 of the control valve 62. These check valves 56, 57 go from the represented release position into a lock position, not represented, when the first module is removed such that no fluid flow can escape from the fluid load 59 via the fluid channel 65. Pressurised fluid also cannot escape from the fluid channel 64 into the environment. When the first module 54 is installed, the preferably purely mechanically actuated check valves go from the release position, not represented further, into the represented release position and thus allow a fluid flow through the fluid channels 64 and 65.

The assembly represented in FIG. 4 and designated with B has a second valve 148 which can be integrated into one of the three previously indicated embodiments of the fluid systems 1, 61, 81 together with an assigned throttle 149 instead of the valve 48 and the throttle 49. For example, the valve 148 is designed as a 2-2-way valve. The throttle 149 is also looped into a partial branch 150, which runs parallel to a partial branch 151, in which the valve 148 is arranged. Accordingly, by switching the valve 148 between a release position and a lock position, either a fluid flow can be released through the two partial branches 150 and 151 connected in parallel or only one fluid flow can be released through the partial branch 150 equipped with the throttle 149. The valve 148 is thus provided to enable a switchover between a release position for the fluid channel and a throttle position for the fluid channel.

The invention claimed is:

1. A fluid system with a safety-oriented valve assembly, which is designed to influence a fluid flow between a fluid source or a control valve and a fluid load and which comprises a valve housing, which has a first fluid connection for a fluidic connection with a fluid connection of the fluid source or the control valve and a second fluid connection for coupling the fluid load as well as a fluid channel between the fluid connections, wherein a first valve, which can be electrically or fluidically switched between a fluid supply position, or open position, and a fluid discharge position, or closed position, is arranged in the fluid channel, wherein an electrically or fluidically actuable second valve, which is a constantly open valve having a vent, which is unthrottled in a first switch position and which is throttled in a second switch position and, thereby, always allows a fluid flow irrespective of the switch position of the second valve, and which can be switched between the first switch position for the fluid channel and the second switch position for the fluid channel, is arranged in the fluid channel, and wherein a sensor for detecting a fluid pressure and for outputting a fluid pressure-dependent sensor signal is arranged in a section of the fluid channel between the first valve and the second valve, as well as with a controller, which is designed to process the sensor signal and to process control signals for the first valve and the second valve, and wherein the controller is designed for carrying out a test operation for the first valve, which can be triggered by an internal and/or external signal, wherein, to carry out the test operation, the controller is configured to switch the first valve between the open position and the closed position, and is further configured to switch the second valve from the first switch position to the second switch position, and is still further configured to compare the sensor signal with a predefinable threshold value.

2. The fluid system according to claim 1, wherein the controller is arranged in the valve housing and is designed for determining status information determined from the sensor signal and the control signals and has an interface for providing status information.

3. The fluid system according to claim 2, wherein the controller is designed for unidirectional or bidirectional data communication with a superordinate control device according to the HART protocol.

4. The fluid system according to claim 1, wherein the controller is connected, via an electric line arrangement, to the first valve and the second valve and the sensor.

5. The fluid system according to claim 1, wherein at least one fluidically pilot-controlled control valve is assigned to the safety-oriented valve assembly, wherein the safety-oriented valve assembly is looped into a fluidic control line of the control valve and is designed to influence a position of a valve body of the control valve.

6. The fluid system according to claim 5, wherein the control line of the control valve has a control branch, which is in fluidically communicative connection with a fluid connection of the control valve, wherein a throttle device is arranged in the control branch.

7. The fluid system according to claim 1, wherein the first fluid connection of the safety-oriented valve assembly is connected to a fluid channel of a control valve, and wherein the second fluid connection of the safety-oriented valve assembly is designed as a fluid connection for the connection of the fluid load, wherein the control valve and the safety-oriented valve assembly comprises a fluidic series connection for a redundant influence of a cross-section of the fluid channel.

8. The fluid system according to claim 7, wherein the first valve is arranged in a first valve module and the second valve is arranged in a second valve module, and wherein a stop valve is arranged in the fluid channel of the second valve module between the first valve and the second valve, wherein the stop valve has a mechanical valve actuation which is designed to interact with the first valve module and which is configured for a release position of the stop valve when the first valve module is present.

9. The fluid system according to claim 1, wherein the fluid system consists of only the safety-oriented valve assembly.

10. The fluid system according to claim 1, wherein the sensor is electrically connected to the controller, and wherein the controller is designed to provide control signals for the valve as a function of sensor signals of the sensor.

11. The fluid system according to claim 1, further comprising a fluid load connected to the second fluid connection and a process valve connected to the fluid load, the process valve having a valve housing which is passed by a fluid channel, which opens into an input connection and into an output connection which are respectively designed on the valve housing, the process valve further having a valve body, which is movably received in the valve housing and designed to influence a cross-section of the fluid channel within the valve housing, and wherein the fluid load comprises a fluid actuator, which is designed for a fluid-controlled introduction of movement to the valve body.

* * * * *